United States Patent Office 3,835,100
Patented Sept. 10, 1974

3,835,100
METHOD FOR ANIONIC POLYMERIZATION OF ALPHA-PYRROLIDONE OR ALPHA-PIPERIDONE WITH QUATERNARY AMMONIUM SALTS
Hikaru Sekiguchi, Panayota Rapacoulia, and Bernard Coutin, Paris, France, assignors to Agence Nationale de Valorisation de la Recherche (Anvar), Courbevoie, France
No Drawing. Filed Feb. 14, 1972, Ser. No. 226,314
Int. Cl. C08g 20/18
U.S. Cl. 260—78 P
9 Claims

ABSTRACT OF THE DISCLOSURE

The invention proposes new catalysts consisting of quaternary ammonium salts of lactams or other organic compounds having one or more hydrogen atoms of acidic nature and having pK values ranging from about 14 to about 30, which catalysts are obtained by reacting quaternary ammonium alkoxides with corresponding lactams or weak acids, as well as a new process for polymerizing omega-lactams, in particular alpha-pyrrolidone and alpha-piperidone, in presence of the above catalysts.

---

The present invention relates to polymerization of omega-lactams, to novel catalysts suitable for promoting this polymerization and to a process for the production of such catalysts and, more particularly, this invention concerns methods for preparing alpha-pyrrolidone and alpha-piperidone polymer, since it is in this application that the invention seems to have most interest, although this application is by no means exclusive, which polymers are polyamides called respectively "polybutanamide" (nylon-4) and "polypentamide" (nylon-5).

It is known that numerous essentially basic catalysts have already been suggested for polymerizing lactams of the kind aforesaid, such as for instance lithium, sodium and potassium lactimates, notably pyrrolidonates and piperidonates.

The use of the salts however is not free of some drawbacks owing to their marginal solubility in monomer and their insolubility in common polymerization solvents.

Moreover, it is known that such salts lose very rapidly their catalytic activity, so that the common practice is to form them *in situ* by introducing into the mass of monomer to be polymerized suitable chemical reactants capable of forming said catalysts within the reaction medium itself, by a reaction which is most often in equilibrium, notably with the monomer, and subsequently, to remove, though with difficulties, the reaction byproducts.

However, even if the aforesaid drawbacks can be obviated, the catalysts of this kind are nevertheless able to lose their activity in the course of the polymerization itself, in particular upon contact with imide groupings being formed.

Finally, the polymerization does not proceed usually under very satisfactory conditions. More specifically, the monomer to polymer conversion rate is fairly low and may only be increased at the expense of polymerization degree. In any case, the upper limit of polymerization degree remains at a rather low value. It is difficult to free polymer of traces of catalysts, which traces cause a yellowing and degradation of polymer. Said traces also catalyze the depolymerization of the polymer product upon the heating thereof, so that spinning or any other melt-conversion becomes extremely difficult.

It has already been suggested in order to overcome in part the last-mentioned drawbacks to add to the polymerization medium solutions based on quaternary-ammonium hydroxides. Nevertheless the aforesaid difficulties related to use of such catalysts are not overcome by such a method. More specifically, such bases are not stable in time and must therefore be kept and used in aqueous solution. Since polymerization can only be carried out in a perfectly anhydrous medium, it is required to previously effect a tedious dehydration of the reaction medium, e.g. by adding xylene and thereafter effecting vacuum distillation of water-xylene azeotrope while preventing foaming, etc. All these steps require accordingly much time and labor. They lead to losses of reactants and increase the danger of admission of impurities into the reaction medium.

The invention has for its object to provide reaction catalysts of high activity, free of the aforesaid drawbacks and capable of storage in anhydrous state during extended periods.

The process of polymerizing omega-lactams, in particular alpha-pyrrolidine and alpha-piperidone, according to the invention, is characterized by the use, as reaction catalysts, of quaternary ammonium salts of lactams or other organic compounds having one or more hydrogen atoms of acidic nature, that is having a pK value between about 14 and 30, said quaternary ammonium salts being introduced directly into the reaction medium in the absence of any extraneous addition of OH ions.

The invention further provides the novel industrial products comprised of quaternary ammonium lactimates and quaternary ammonium salts of weak acids, such as t-butyl alcohol, fluorene, carbazole, malonic diesters or succinimide.

A further object of the invention comprises a method of preparing these quaternary ammonium salts, said method being characterized in that it comprises reacting quaternary ammonium alkoxides with corresponding lactams or weak acids within an inert organic solvent in which said lactams or weak acids are soluble while the corresponding quaternary ammonium salts are insoluble.

There is thus obtained very active catalysts which enable much higher conversion rates and polymerization degrees to be achieved, in particular during the polymerization of alpha-pyrrolidone and alpha-piperidone, when compared with the results obtained by prior-art alkaline catalysts. It has also been demonstrated that some of these catalysts can be kept for indefinite periods without losing their activity under easily established conditions (in dry state, under vacuum and in the cold). This is true for all quaternary ammonium salts of lactams and weak acids such as, e.g. t-butanol, succinimide and malonic esters. Moreover, this activity remains at a high level even in the presence of imide groupings. The catalysts can be obtained in a state of very high purity. The catalyst residues which may remain in the polymer after segregation are in no way objectionable. Upon heating the polymer, said residues are removed by simple decomposition followed by volatilization.

Further objects and features of the invention will become clear upon reading the following description of preferred embodiments of the invention, in particular with respect to polymerization of alpha-pyrrolidone and alpha-piperidone, as well as preferred catalysts and methods of preparing the same.

Considering first the catalysts themselves, they may be represented by the general formula:

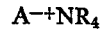

wherein:

A⁻ denotes an anionic group of a lactam or a weak acid having a pK value between about 14 and about 40, said acids being accordingly non-dissociable in water, and ⁺NR₄ denotes a quaternary ammonium cation.

More specifically, the group A⁻ can be formed of a lactimate group, such as alpha-pyrrolidonate, alpha-piperidonate or epsilon-caprolactimate group. It may also be formed of alkoxide groups derived from lower members of alcohols such as methyl, ethyl, propyl or t-butyl alcohol, or of imide groups such as succinimide and phthalimide or groupings having active methylene or azothydric units, such as fluorene, malonic esters and carbazole.

As to the four groups R included in the cationic grouping +NR₄, they may be the same or different. In particular, they may be comprised of four alkyl groups. In other preferred cationic groupings, three of the R groups are alkyl and the fourth is an aryl or aralkyl group. For example, the quaternary ammonium cations may be selected in the group consisting of tetramethylammonium, tetraethylammonium, tetrapropylammonium, tetrabutylammonium, tetraheptylammonium, phenyltrimethylammonium, benzyltrimethylammonium or cyclohexyltrimethylammonium.

As already mentioned, quaternary ammonium salts of weak acids other than primary and secondary alcohols can be prepared by reacting said weak acids with a quaternary ammonium alkoxide corresponding to the desired salt. The quaternary ammonium alkoxide can be prepared in a manner known per se, such as by reacting an alkali metal alkoxide (derived from a primary or secondary alcohol) with the corresponding quaternary ammonium halide. The following equations are representative of these two reactions:

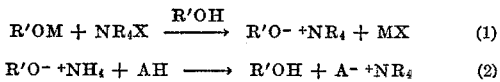

$$R'OM + NR_4X \xrightarrow{R'OH} R'O^- {}^+NR_4 + MX \quad (1)$$

$$R'O^- {}^+NH_4 + AH \longrightarrow R'OH + A^- {}^+NR_4 \quad (2)$$

wherein, R' stands for an alkyl group such as methyl or ethyl, M is an alkali metal such as sodium or potassium, X represents a halogen such as chlorine or bromine, AH is a lactam or a weak acid of the kind under consideration. In view of the low solubility required for the metal halides MX, the members lithium for M and iodine for X should be excluded.

More specifically, quaternary ammonium salts of lactams or of the other weak acids under consideration, with exception of primary and secondary alcohols, can be prepared by the following operational method.

An anhydrous solution of a known quantity of alkali alkoxide (for example sodium methalonate or potassium ethalonate) is mixed with an anhydrous alcoholic solution containing an equivalent amount of corresponding quaternary ammonium halide (chloride or bromide). The mixture becomes turbid. After standing for about one hour, in the course of which there may be added if desired a precipitation agent such as ethyl ether, the mixture is filtered to remove the formed mineral salt. The solvent is distilled off until dryness under nitrogen and reduced pressure, without heating above 40° C. To this end, a second inert solvent (benzene or the like) may be added to drive out the remaining alcohol. There will be obtained a residual syrup consisting of quaternary ammonium alkoxide. There is added thereto a slight excess of lactam or weak acid corresponding to the anion of the desired quaternary ammonium salt, dissolved in an inert solvent, in which said lactam or weak acid is soluble whereas the desired quaternary ammonium salt is insoluble, such as for example ethyl ether or dioxane. The solution is agitated and left standing, preferably under cooling. The precipitated crystalline body is the desired quaternary ammonium salt of lactam or weak acid. Upon adding a further amount of the last-named solvent (precipitating solvent), there is obtained a second crop. After filtering, the solvent is distilled under reduced pressure at room temperature, then a further amount of the precipitating solvent is added thereto to separate another amount of the product. The latter steps are repeated two or three times until no further precipitate is formed.

When using as catalyst quaternary ammonium primary and secondary alkoxides, the latter may be added, if desired, into the reaction mixture in the form of alcoholic solutions, the solvent being then previously removed by simple distillation under vacuum before starting polymerization.

As to the polymerization reaction of omega-lactams in the presence of catalysts according to the invention, use will be made advantageously of initiators in order to increase both the rate of conversion and the molecular weight of the formed polymer. The initiators consist, for example, of N-acyl-lactams which are exemplary compounds of chemical species taking actually part in the polymerization. A second class of initiators include chemical compounds which replace the N-acyl-lactams in the initiation stage exclusively and which provide in situ molecules having at the onset of the growing a terminal cyclic N-acylated lactam unit similar to N-acyl-lactams. Within said class, may be mentioned chemical compounds including a tertiary nitrogen atom bound at least to one electron-attracting grouping, said compound being e.g. triacyl-amides, alkyldiacylamides, carbodiimides and N-cyanilactams. Finally, a third class of initiators comprises compounds devoid of anionic-polymerization active sites but capable of generating in situ, by reaction with the monomer and/or the catalysts, a compound as defined in either of the two first classes previously disclosed. Such is the case of acid halides, acid anhydrides, esters, lactones, iminoethers, halo-derivatives of triazine and diketenes.

As to the amounts of quaternary ammonium salts used as catalysts in the polymerization, they are comprised between about 0.1 and 20 mol percent and, preferably, between about 0.5 and 10 mol percent in case of alpha-pyrrolidone, between about 2 and 20 mol percent for alpha-piperidone, according to the nature of the catalyst used, the desired degree of polymerization of the polyamide and the required conversion rate. The initiators are used in amounts generally comprised between 0 and 10 mol percent and preferably 0.5 to 5 mol percent in accordance with the desired degree of polymerization.

The catalysts can be added to the lactam monomer before, during or after the addition of initiators. However, best results are generally obtained when preparing a solution of the catalyst in the monomer and introducing into said solution, at the temperature of polymerization, the initiator either as such or in solution in monomer.

The polymerization can be carried out in bulk, in suspension or in solution. In the case of polymerization in suspension, aliphatic hydrocarbons such as hexane and heptane, in which the lactam monomer is not soluble, may be used as non-solvents. Neutral or basic inert solvents, such as benzene, toluene, ethyl ether, tetrahydrofuran, dioxane, acetonitrile and hexamethylphosphorotriamide, which provide at certain concentrations homogenous solutions of monomer, catalyst and initiator, can be used for polymerizations in solution. In the latter case, the formed polymers separate from solution after a certain time interval, without discontinuation of the growing thereof.

Preferably, polymerization is effected in an inert and dry atmosphere, in order to preclude any hydration and oxidation of the reaction medium. As to the polymerization temperature, it will be noted that the rate of conversion and the degree of polymerization are the higher when the reaction temperature is lower, with however the proviso that it should always be above the melting point of the original reaction mixture. Generally, this temperature ranges from 20 to 80° C. and, preferably, from 25 to 60° C. for polymerization of alpha-pyrrolidone, and from 40 to 100° C. and, preferably, from 40 to 80° C. for that of alpha-piperidone, when said polymerizations are carried out in bulk or in suspension, said temperatures ranging from 0° C. to the indicated upper limits when polymerizations take place in solution.

The time of polymerization varies in accordance with operational conditions but will be most often between 1 and 24 hours for the polymerization of alpha-pyrrolidone and between 3 hours and a few days when polymerizing alpha-piperidone.

The formed polyamides can be separated by extracting the monomer with solvents, such as water, methanol, ethanol or mixtures thereof, or by dissolving the reaction product in solvents for the polymer, such as formic acid, phenol and m-cresol, and by reprecipitating it. In some cases, the polymerization can be carried out in a mold in order to obtain directly molded products. The catalyst remaining in the polymer may be decomposed by heat-treatment of the latter.

In order to further illustrate the invention, there are given some examples concerning the production of catalysts of the invention and the use thereof in polymerization reactions of alpha-pyrrolidone and alpha-piperidone. The high activity of the catalyst of the invention will become apparent when comparing the conversion rates and the degrees of polymerization of the same monomers but with sodium salts catalysts, on the one hand, and those of the invention, on the other hand, all of which have similar anions.

EXAMPLE 1

Preparation of tetramethyl-ammonium pyrrolidonate 1.15 g. of sodium metal is reacted with 25 ml. of perfectly anhydrous ethyl alcohol, dehydrated over magnesium. 5.48 g. of tetramethyl ammonium chloride, ground and kept under vacuum on phosphorous pentoxide for dehydration, are dissolved in 25 ml. perfectly anhydrous and slightly heated ethyl alcohol. Immediately before crystallization of tetramethyl-ammonium chloride, both solutions are combined in the course of a first stage of the process and have added thereto 50 ml. of dry ethyl ether. After one hour standing, the solution is filtered while protected from humidity and carbon dioxide, in order to remove the formed sodium chloride, and the solvent is dry-distilled without exceeding a temperature of 30° C., under reduced pressure of nitrogen, achieved in the first place by means of a siphon and thereafter by means of a vaned pump. The residual syrup is formed of tetramethyl-ammonium ethanolate.

In a second step of the process, the residual syrup has added thereto a solution of 4.2 g. alpha-pyrrolidone in 50 ml. anhydrous ethyl ether; the mixture is shaken to provide a thorough blending and thereafter there is added anhydrous ether in an amount sufficient to bring the total volume of the solution to 500 ml. After 24 hours of standing in the cold, the mixture is filtered to separate a white, crystalline voluminous precipitate which represents the first crop of tetramethyl-ammonium pyrrolidonate which is kept under vacuum on phosphorus pentoxide. The filtered solution is dried, at a temperature not exceeding 30° C., under reduced pressure of hydrogen and thereafter is combined with a further amount of 500 ml. anhydrous ethyl ether. After 24 hours, there is thus obtained a second crop of the same order of magnitude as the first crop, of pure quaternary ammonium salt. The two last-mentioned operations are repeated twice more and there is obtained a total of 5.3 g. of tetramethyl-ammonium pyrrolidonate which is a white, finely crystalline and hygroscopic product, soluble both in acetonitrile and in formamide; M.P.: 150–151° C.; yield: 67%.

EXAMPLE 2

Preparation of tetramethyl-ammonium piperidonate and caprolactimate

This example uses exactly the same method as in Example 1, but with replacement in the second step of the process of alpha-pyrrolidone by alpha-piperidone or epsilon-caprolactam, respectively.

In the first case, the product is tetramethyl-ammonium piperidonate (M.P. 138° C.) and in the second case, tetramethyl-ammonium caprolactimate (M.P. 123° C.).

EXAMPLE 3

Preparation of tetrabutyl-ammonium piperidonate 1.15 g. of sodium metal is reacted with 25 ml. of perfectly anhydrous ethyl alcohol to obtain an alcoholic solution of sodium alkoxide. 16.1 g. of tetrabutyl-ammonium bromide is dissolved in 25 ml. of perfectly anhydrous ethyl alcohol and the treatment is continued as described in example 1. The first crop provides already 7.5 g. of white, crystalline and very voluminous tetrabutyl-ammonium piperidonate; M.P.: 161° C.; yield: 44%.

By the same method and using the corresponding lactam, there is obtained with a yield of 7%, tetrabutyl-ammonium caprolactimate as very fine, needle-shaped white crystals; M.P.: 155–158° C.

By the same method and using tetramethyl-ammonium chloride and corresponding weak acids, there is obtained tetramethyl-ammonium t-butanolate, as needle-shaped crystals of a light brown color; M.P. 140° C. (decomposition); yield: 26%; and diethyl tetramethyl-ammonium malonate, as white waxy crystals; M.P.: 69° C.; yield: 51%.

EXAMPLE 4

By the same method as in example 1 and using as initial quaternary ammonium halides, tetraethyl-ammonium chloride, phenyltrimethyl-ammonium chloride or benzyltriethyl-ammonium chloride and, as lactams, alpha-pyrrolidone, alpha-piperidone or epsilon-caprolactam, there is obtained the quaternary ammonium salts of corresponding lactams.

EXAMPLE 5

Preparation of carbazyltetramethyl-ammonium

For preparing tetramethyl-ammonium alkoxide, the method used in similar to that of Example 1.

In the second step of the process disclosed in Example 1, the lactam is replaced by carbazole while ethyl ether is replaced by dioxane. There is obtained a first crop of carbazyl-tetramethyl-ammonium, amounting to 8.6 g of voluminous crystals of brown-yellow color; yield: 72%.

By the same method and starting with succinimide, there is obtained tetramethylsuccinimide, as a white crystalline product; M.P.: 175° C. (decomposition); yield: 58%.

EXAMPLE 6

Polymerization of alpha-pyrrolidone

The polymerization of alpha-pyrrolidone is effected under the conditions defined in Table I hereunder.

TABLE I

| Initiator | Mol percent | Catalyst | Mol percent | Temperature, ° C. | Duration of polymerization (hours) | Conversion rate, percent | Intrinsic viscosity | Molecular weight |
|---|---|---|---|---|---|---|---|---|
| N-acetylalphapyrrolidone | 2.0 | Tetramethylammoniumpyrrolidonate | 2.0 | 30 | 24 | 84.2 | 1.82 | 9,500 |
| | 1.0 | | 1.0 | 30 | 24 | 52.1 | 1.50 | 7,200 |
| | 0.5 | | 0.5 | 30 | 24 | 27.6 | 1.30 | 5,800 |
| | 0.2 | | 0.2 | 30 | 24 | 11.6 | 0.81 | 2,300 |
| | 0.1 | | 0.1 | 30 | 24 | 4.4 | 0.58 | 1,800 |
| | 0 | | 2.0 | 30 | 24 | 4.6 | 1.64 | 8,200 |
| Do | 2.0 | Sodium pyrrolidonate | 2.0 | 30 | 24 | 77.8 | 0.98 | 3,900 |
| | 1.0 | | 1.0 | 30 | 24 | 48.0 | 0.95 | 3,760 |
| | 0.5 | | 0.5 | 30 | 24 | 25.0 | 0.55 | 1,720 |
| | 0.2 | | 0.2 | 30 | 24 | 11.2 | 0.47 | 1,370 |
| | 0.1 | | 0.1 | 30 | 24 | 3.4 | 0.35 | 900 |

EXAMPLE 7

Polymerization of alpha-piperidone

This example is carried out by using the initiator and the catalysts disclosed in Table II, under conditions also shown in the same table. The reduced viscosities shown in the last column have been measured on solutions of 1 g. of polymer in 100 ml. of m-cresol at 25° C.

TABLE II

| Initiator | Mol percent | Catalyst | Mol percent | Temperature, °C. | Duration of polymerization (hours) | Conversion rate, percent | Reduced viscosity |
|---|---|---|---|---|---|---|---|
| N-acetylalpha-piperidone | 2.0 | Tetramethylammonium piperidonate | 8.0 | 47 | 72 | 48 | 0.97 |
| | 2.0 | | 6.0 | 47 | 72 | 46 | 0.81 |
| | 1.0 | | 6.0 | 47 | 72 | 38 | 0.85 |
| | 4.5 | | 4.5 | 47 | 24 | 37 | 0.34 |
| | 2.7 | | 2.7 | 47 | 24 | 24 | 0.30 |
| | 0.9 | | 0.9 | 47 | 24 | 11 | 0.28 |
| Do | 5.0 | Sodium piperidonate | 5.0 | 47 | 24 | 15 | 0.17 |
| | 3.0 | | 3.0 | 47 | 24 | 11 | 0.16 |
| | 2.0 | | 2.0 | 47 | 24 | 9.5 | 0.16 |
| | 1.0 | | 1.0 | 47 | 24 | 1.5 | |

Both tables provided in Examples 6 and 7 clearly emphasize the higher activity, especially marked in the case of Example 7, of the catalysts of the invention when compared to conventional alkali catalysts. These catalysts lead to a higher conversion rate and a much higher degree of polymerization than those obtainable with any of the conventional catalysts. Accordingly, the present catalysts enable truly high polymers to be easily prepared.

EXAMPLE 8

Polymerization of alpha-pyrrolidone in the presence of various catalysts of the quaternary ammonium salt-type of weak acids and lactams There are dissolved in respective amounts of 5.0 g. of pyrrolidone the stipulated dosages of various catalysts shown in Table III, the solution being kept at the disclosed temperatures. Thereafter, the indicated amount of initiator is added and the polymerization is carried out under a stream of nitrogen during the time shown. After polymerization, the product is extracted with a 2:8 methanol-ethyl ether mixture or with pure methanol, when the conversion rate is low, or is dissolved in formic acid and reprecipitated with ether when the conversion rate is high. Reduced viscosity is determined at 25° C. with a concentration of 1 g. in 100 ml. of m-cresol.

EXAMPLE 9

Polymerization of alpha-pyrrolidone in various solvents or non-solvents

The method is similar to that of Example 8 but using, this time, a volume of solvent equal to that of monomer. It will be noted that the monomer is insoluble in hexane and soluble in all other solvents shown in the first column of Table IV.

TABLE IV

| Solvent | Catalyst (tetramethyl-ammonium pyrrolidonate), mol percent | Initiator (N-acetyl-pyrrolidone), mol percent | Temperature, °C. | Duration of polymerization (hours) | Yield, percent | Reduced viscosity |
|---|---|---|---|---|---|---|
| Hexane | 2.0 | 2.0 | 25 | 24 | 37 | 0.27 |
| Benzene | 2.0 | 2.0 | 25 | 24 | 43 | 0.43 |
| Tetrahydrofuran | 2.0 | 2.0 | 25 | 60 | 38 | 0.16 |
| Dioxane | 2.0 | 2.0 | 25 | 60 | 29 | 0.15 |
| Hexamethyl phosphorotriamide | 2.0 | 2.0 | 25 | 60 | 87 | 0.20 |
| Dimethylformamide | 2.0 | 2.0 | 25 | 42 | 39.5 | 0.17 |
| Acetonitrile | 2.0 | 2.0 | 25 | 60 | 2.1 | 0.09 |
| Ethylether | 2.0 | 2.0 | 25 | 60 | 56 | 0.47 |

EXAMPLE 10

Polymerization of alpha-piperidone in the presence of various catalysts of the quaternary ammonium-salt type There are dissolved respectively in 5.2 g. piperidone, the amounts of catalysts shown in table V and the solution is kept at the indicated temperature. There is added afterwards the shown amount of initiator and the polymerization is carried out under a stream of nitrogen for the time-duration disclosed. After polymerization, the product is extracted with a 1:9 ethanol-ethyl ether mixture, when the conversion rate is low or, when the conversion rate is high, is dissolved in formic acid and reprecipitated by addition of ether. The reduced viscosity is determined at 25° C. for a concentration of 1 g./100 ml. of m-cresol.

TABLE III

| Catalyst | Mol percent | Initiator (N-acetyl-pyrrolidone), mol percent | Temperature, °C. | Duration of polymerization (hours) | Yield, percent | Reduced viscosity |
|---|---|---|---|---|---|---|
| Tetramethyl-ammonium pyrrolidonate | 2.0 | 2.0 | 30 | 24 | 84 | 2.64 |
| | 2.0 | 0.02 | 25 | 112 | 4.5 | 0.74 |
| | 2.0 | 2.0 | 55 | 3 | 66 | 0.34 |
| | 2.0 | 2.0 | 78 | 3 | 30 | 0.12 |
| Tetraethyl-ammonium pyrrolidonate | 2.0 | 2.0 | 25 | 24 | 80 | 1.24 |
| Tetrabutyl-ammonium pyrrolidonate | 1.0 | 1.0 | 30 | 24 | 46 | 0.23 |
| Phenyltrimethyl-ammonium pyrrolidonate | 1.0 | 1.0 | 30 | 20 | 32 | 0.25 |
| Benzyltriethyl-ammonium pyrrolidonate | 2.0 | 1.0 | 30 | 24 | 27 | 0.14 |
| Fluorenyltetramethyl-ammonium | 2.0 | 2.0 | 25 | 24 | 25 | 0.11 |
| Fluorenylbenzyltrimethyl-ammonium | 5.0 | 1.0 | 25 | 24 | 34 | 0.12 |
| Carbazyltetramethyl-ammonium | 2.0 | 1.0 | 30 | 24 | 74 | 0.59 |
| Tetramethyl-ammonium ethanolate | 2.0 | 2.0 | 25 | 24 | 41 | 0.47 |

TABLE V

| Catalyst | Mol percent | Initiator (N-acetyl-piperidone), percent | Temperature, °C. | Duration of polymerization (hours) | Yield, percent | Reduced viscosity |
|---|---|---|---|---|---|---|
| Tetramethylammonium piperidonate | 8.0 | 2.0 | 47 | 72 | 48 | 0.97 |
|  | 6.0 | 2.0 | 47 | 72 | 46 | 0.81 |
|  | 6.0 | 1.0 | 47 | 72 | 38 | 0.55 |
|  | 1.6 | 1.0 | 47 | 72 | 19 | 0.43 |
|  | 4.5 | 1.5 | 47 | 24 | 30 | 0.58 |
| Tetrabutylammonium piperidonate | 8.0 | 2.0 | 47 | 72 | 3.5 |  |
|  | 5.0 | 5.0 | 47 | 72 | 31 | 0.18 |
| Carbazyltetramethylammonium | 5.0 | 5.0 | 47 | 24 | 16 | 0.17 |

EXAMPLE 11

Polymerization of alpha-piperidone in solvents

The method is carried out as described in example 10 in the presence of tetramethyl-ammonium piperidonate but also in the presence of a solvent. The steps identified by numbers 1, 2 and 3 in first column of table VI correspond respectively to the following operational conditions:

(1) polymerization in solution in hexamethylphosphorotriamide;

monomer:solvent ratio = 5:3 in volume (2) polymerization in solution in hexamethylphosphorotriamide;

monomer:solvent ratio = 5:5 in volume (3) polymerization in solution in N-methyl alpha-pyrrolidone, monomer:solvent ratio = 5:5 in volume

TABLE VI

| Catalyst, mol percent | Initiator (N-acetyl-piperidone), mol percent | Temperature, °C. | Duration of polymerization (hours) | Yield, percent | Reduced viscosity |
|---|---|---|---|---|---|
| 4.85 (1) | 3.1 | 45 | 114 | 26 | 0.64 |
| 4.85 (2) | 5.1 | 25 | 88 | 38 | 0.57 |
| 4.85 (3) | 5.1 | 45 | 114 | 6 | 0.31 |

There are thus provided, on the one hand, catalysts and, on the other hand, a process for polymerizing omega-lactams having numerous advantages and enabling polymers of very high molecular weight to be produced with high yields.

The important advantages derived from the use of catalysts according to the invention will be recalled herebelow.

Some of these catalysts, especially quaternary ammonium salts of lactams, are found to be very stable with the time and, in opposition to corresponding alkali metal lactimates, they preserve a high catalytic activity with the time.

They are easy to purify, owing to their solubility in inert organic solvents, such as acetonitrile, by recrystallization or reprecipitation. On the contrary, purification of conventional alkali metal catalysts is often difficult, or even impossible.

Due to their solubility, in numerous solvents, catalysts of the invention give the possibility of polymerizing omega-lactams of the considered type in homogenous solutions.

Moreover, catalysts of the invention are spontaneously decomposed during a heat treatment of the polymer. As a result, they are unable to catalyze the degradation or the depolymerization of the polymer. This self-destruction of the catalysts according to the invention, together with the remarkably high degree of polymerization obtainable thereby, confer to the polymers a substantial thermal stability and make useless most of the steps previously taken in order to stabilize polymers of the kind aforesaid.

Since the catalysts may be obtained in perfectly anhydrous condition, their direct introduction into the reaction medium is possible without recourse to preliminary dehydrating operations of the reaction medium. The high purity of the catalysts overcomes likewise the problems of the prior art involved by the admission of external impurities into the reaction medium.

We claim:

1. A process for producing a solid polypyrrolidone or polypiperidone which comprises polymerizing pyrrolidone in an inert and dry atmosphere or piperidone in the presence of a catalyst selected from the group consisting of quaternary ammonium alpha-pyrrolidonate, alpha-piperidonate, epsilon-caprolactimate and higher lactimates, quaternary ammonium methanolate, ethanolate, propylate, butanolate and t.butanolate and quaternary ammonium derivatives of fluorene and carbazole under anhydrous conditions.

2. The process according to claim 1 wherein the quaternary ammonium cation of salts is selected from the group consisting of tetramethyl-ammonium, tetraethyl-ammonium, tetrabutyl-ammonium, phenyltrimethyl-ammonium or benzyltrimethyl-ammonium.

3. A process for producing a solid polypyrrolidone which comprises polymerizing pyrrolidone in an inert and dry atmosphere in the presence of a catalyst selected from the group consisting of quaternary ammonium alpha-pyrrolidonate, alpha-piperidonate, epsilon-caprolactimate and higher lactimates, quaternary ammonium methanolate, ethanolate, propylate, butanolate and t.butanolate and quaternary ammonium derivatives of fluorene and carbazole and under anhydrous conditions, said polymerization being conducted at from 20 to 80 degrees C. when the polymerization is carried out in bulk or in suspension, and between about 0 and 80 degrees C. when the polymerization is carried out in an inert organic solvent.

4. The process according to claim 3, wherein the reaction is effected at a temperature between about 25 and 60° C.

5. The process according to claim 4, wherein the catalyst is used in a proportion ranging from about 0.1 to about 10 mol percent relative to alpha-pyrrolidone used.

6. A process for producing a solid polypiperidone which comprises polymerizing piperidone in an inert and dry atmosphere in the presence of a catalyst selected from the group consisting of quaternary ammonium alpha-pyrrolidonate, alpha-piperidonate, epsilon-caprolactimate and higher lactimates, quaternary ammonium methanolate, ethanolate, propylate, butanolate and t.butanolate and quaternary ammonium derivatives of fluorene and carbazole and under anhydrous conditions, said polymerization being conducted at from about 40 to 100 degrees C. when the polymerization is carried out in bulk or in suspension and at a temperature from 0 to about 100 degrees C. when the polymerization is carried out in an inert organic solvent.

7. The process according to claim 6, wherein the reaction is carried out at a temperature from about 40 to about 80° C.

8. The process according to claim 6, wherein the amount of catalyst used ranges from about 2 to 8 mol percent relative to the alpha-piperidone used.

9. A process for producing solid polypyrrolidone which comprises polymerizing alpha-pyrrolidone in an inert and dry atmosphere in the presence of tetramethylammonium pyrrolidonate as a catalyst under anhydrous conditions.

References Cited

UNITED STATES PATENTS 2,973,343   2/1961   Ney _____ 260—78 P

HAROLD D. ANDERSON, Primary Examiner

U.S. Cl. X.R.

260—78 L, 239.3 R, 294.7, 326.5 FL